United States Patent [19]

Chu et al.

[11] 4,055,217

[45] Oct. 25, 1977

[54] METHOD FOR MAINTAINING A VAPOR BLANKET IN A CONDENSATION HEATING FACILITY

[75] Inventors: Tze Yao Chu, Lawrence Township, Mercer County; George Michael Wenger, Franklin Township, Somerset County, both of N.J.

[73] Assignee: Western Electric Company, Inc., New York, N.Y.

[21] Appl. No.: 654,242

[22] Filed: Feb. 2, 1976

[51] Int. Cl.² .......................................... F28D 15/00
[52] U.S. Cl. ........................................ 165/1; 165/105; 219/439; 228/180 R; 261/103; 261/106
[58] Field of Search .................. 165/105, 1; 29/498; 228/180; 219/439; 261/99, 103, 106, 154

[56] References Cited

U.S. PATENT DOCUMENTS

| 1,490,931 | 4/1924 | Larose | 261/106 |
|---|---|---|---|
| 1,860,111 | 5/1932 | Miller | 261/106 |
| 1,876,368 | 9/1932 | Walton | 261/99 |
| 2,195,449 | 4/1940 | Delen | 261/154 |
| 3,514,572 | 7/1950 | Gaugler | 261/103 |
| 3,823,307 | 7/1974 | Weiss | 219/439 |
| 3,866,307 | 2/1975 | Pfahl | 29/498 |
| 3,904,102 | 9/1975 | Chu | 228/180 |
| 3,916,822 | 11/1975 | Robinson | 165/105 |
| 3,947,240 | 3/1976 | Pfahl | 165/105 |
| 3,996,604 | 12/1976 | Kimura | 165/105 |

Primary Examiner—Ronald H. Lazarus
Assistant Examiner—Daniel J. O'Connor
Attorney, Agent, or Firm—D. J. Kirk

[57] ABSTRACT

This disclosure is directed to maintaining a blanket of secondary vapor intermediate a hot primary vapor and the atmosphere, in a condensation heating facility, to prevent losses of the primary vapor to the atmosphere. A secondary liquid is transported through the secondary vapor into the hot primary vapors where the secondary liquid is vaporized to supplement the secondary vapor.

2 Claims, 1 Drawing Figure

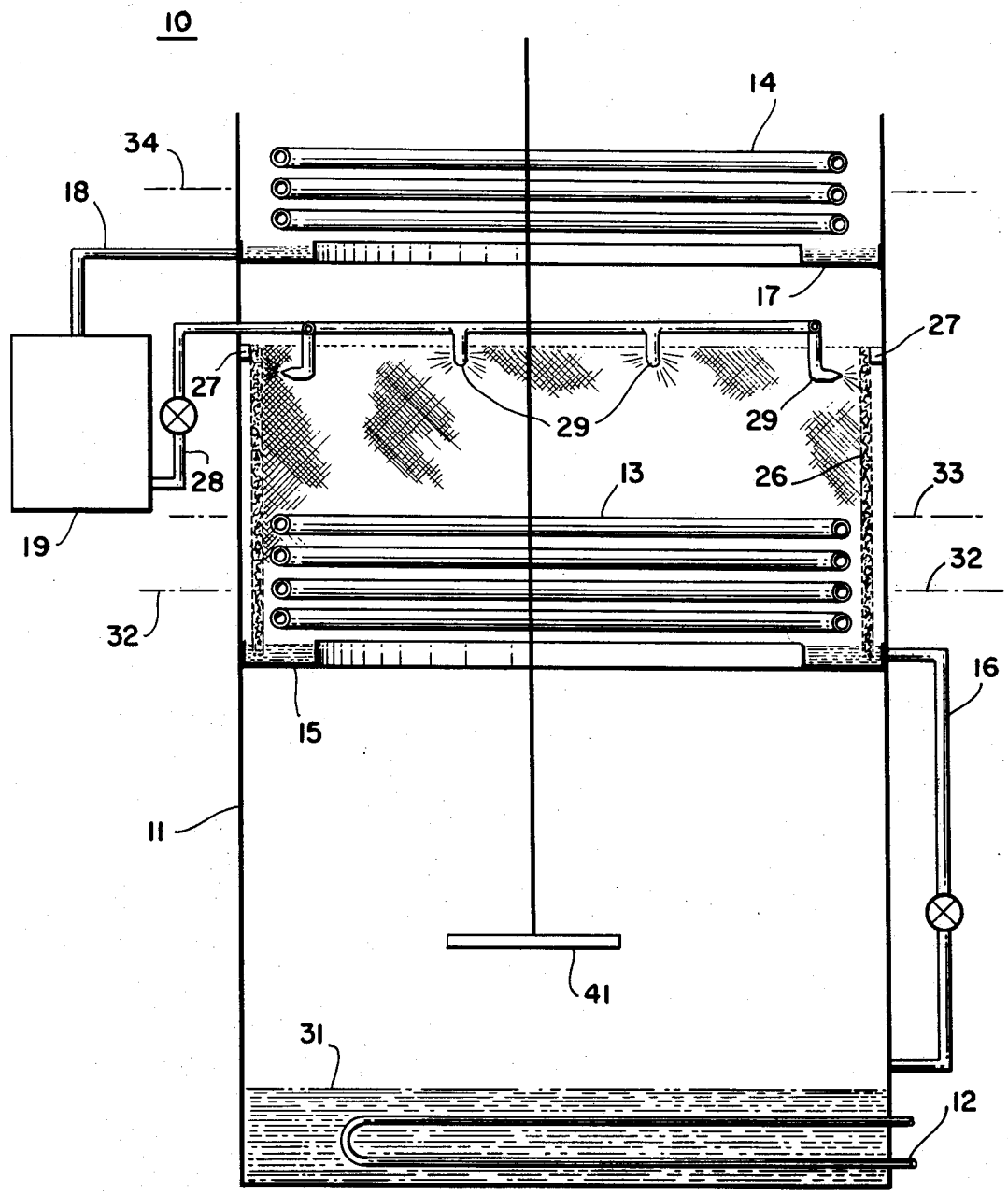

METHOD FOR MAINTAINING A VAPOR BLANKET IN A CONDENSATION HEATING FACILITY

BACKGROUND OF THE INVENTION

1. Field of the Invention

This invention relates to a condensation heat transfer facility having therein a primary body of hot saturated vapor with a secondary body of vapor interposed between the primary body of vapor and the atmosphere. In particular, the invention is directed to a method for maintaining the secondary body of vapor.

2. Description of the Prior Art

Various diverse operations such as soldering, fusing, brazing, curing, cooking, etc. require that articles be heated to elevated temperatures. One method of heating articles to the desired elevated temperatures is described in U.S. Pat. No. 3,904,102 to Chu et al. which issued on Sept. 9, 1975 and is assigned to the assignee of the instant invention.

The Chu et al. patent describes a condensation heating facility which is open to the atmosphere in order to facilitate the entry and removal of articles therefrom. The articles to be heated to elevated temperatures are placed in a primary body of hot saturated vapors where a portion of the vapor will condense thereon and transfer thereto its latent heat of vaporization to heat said articles. A secondary body of vapor of a relatively inexpensive material is interposed between the relatively expensive primary body of saturated vapor and the atmosphere to reduce or substantially eliminate losses to the atmosphere of the hot primary vapor due to convection, diffusion and drag-out.

Although the secondary body of vapor has been found to be effective to reduce significantly the losses of the expensive primary vapor, a portion of both the primary and secondary vapors are continuously lost to the atmosphere across the secondary vapor-air interface. A significant contributor to such losses has been found to be the method of providing supplemental secondary vapor in order to maintain the secondary body of vapor. A most important parameter relating to the above-referred to losses is the disturbance to the primary-secondary vapor interface when generating supplemental secondary vapor. Such a disturbance will increase the loss of the secondary vapors and, more importantly will result in additional losses of the expensive primary vapors to the atmosphere.

The secondary body of vapor may be supplemented by (a) vaporizing a secondary liquid by feeding said liquid directly into the hot primary liquid, (b) vaporizing the secondary liquid by spraying it over the hot primary-secondary vapor interface, or (c) providing a secondary vapor generator, outside the facility, which communicates with and supplements the body of secondary vapor.

Although all of the above methods have each met with a measure of success in maintaining the secondary body of vapor, each has definite drawbacks. The feeding of a secondary liquid directly into the hot primary liquid or spraying of such liquid over the primary-secondary vapor interface causes violent mixing resulting in additional losses of the expensive primary vapor to the atmosphere. The use of a secondary vapor generator necessitates additional expensive apparatus which requires a high degree of control.

SUMMARY OF THE INVENTION

The foregoing problems have been overcome by the instant method for maintaining a secondary body of vapor, above a primary body of vapor, in a condensation heating facility wherein a wick is mounted within the facility. The wick transports a secondary liquid through the body of secondary vapor and into contact with the primary vapor to vaporize the secondary liquid to provide supplemental vapor in order to maintain the secondary body of vapor.

By wicking the secondary liquid through the secondary vapor zone, the secondary liquid advantageously vaporizes slowly and uniformly over a large surface area and violent mixing does not take place.

Advantageously, such a wicking arrangement is both inexpensive and easy to install.

Additionally, the wick can be easily removed for replacement or periodic cleaning.

BRIEF DESCRIPTION OF THE DRAWING

The accompanying FIGURE represents diagrammatically a partial sectional view in elevation of a condensation heat transfer facility incorporating the instant inventive concepts.

DETAILED DESCRIPTION

A preferred embodiment of the instant condensation heat transfer facility, generally indicated by the numeral 10, is shown in the sole FIGURE of the drawing. The facility 10 is comprised of a vessel 11, open to the atmosphere, and having a heating coil 12 which may be, for example, electrically operated. The heating coil 12 may be supplemented by an external source of heat applied to the vessel 11 such as a hot plate or the like (not shown).

A set of primary cooling coils 13 are located intermediate the top and bottom of the vessel 11 and receive a circulating cooling medium from a source, not shown. A set of secondary cooling coils 14 are located adjacent the upper portion of the vessel 11 and also receive a circulating cooling medium from a source not shown. The set of secondary cooling coils 14 is operated at a lower temperature than the set of primary cooling coils 13.

Fixedly mounted, around the inner periphery of the vessel 11, immediately below the set of primary cooling coils 13 is a primary trough 15 which receives primary condensate draining off the set of primary cooling coils 13. The primary condensate is discharged into a valved line 16 which communicates with the lower portion of the vessel 11. Additionally, a secondary trough 17 is mounted around the inner periphery of the vessel 11 immediately below the set of secondary cooling coils 14. The secondary trough 17 receives condensate draining off the set of secondary cooling coils 14 and discharges that condensate into the line 18 and into a storage tank 19. The storage tank 19 may advantageously contain a filter to remove dirt, flux or other contaminants from the condensate. Additionally, tank 19 is connected to a supplemental supply (not shown) of secondary liquid to provide make-up for the secondary vapors lost to the atmosphere.

A wick 26 is suspended from a hanger 27 about the inside periphery of the vessel 11 and extends from a point just below the set of secondary cooling coils into the primary condensate in the trough 15. A metered pump line 28 extends from the storage tank 19, into the upper portion of the vessel 11, and terminates in a plurality of spray nozzles 29—29.

In operation, a mixture of two liquids as hereinafter described, is introduced into the vessel 11 to a level generally indicated by the numeral 31 and is brought to and maintained at a boil by means of the heating coil 12.

One of the two liquids is a primary heat transfer liquid characterized by the following general properties:

a. A boiling point at atmospheric pressure at least equal to, and preferably slightly above, the temperature required for the operation to be performed (i.e., soldering, fusing, brazing, curing, cooking etc.). For example, in a soldering operation, this boiling point is at least equal to, and preferably above, the melting point of the solder used in the operation.

b. Must produce a saturated vapor which is denser than air at atmospheric pressure.

c. Desirably has a well defined and substantially constant boiling point for better control over the process.

d. Desirably produces a saturated vapor which is non-oxidizing, chemically stable and inert, non-toxic and non-inflammable.

In addition to the general properties hereinabove recited, when the facility is used to heat an article such as a printed circuit board having mounted thereon for soldering various electrical components, the primary liquid advantageously should not be electrically conducting.

The other of the two liquids is a secondary liquid characterized by the following properties:

a. A lower boiling point at atmospheric pressure than the primary liquid.

b. Produces a vapor which, for the embodiments disclosed herein is, at atmospheric pressure, less dense than saturated vapor from the primary liquid at this pressure and which is denser than air at this pressure and at the same temperature.

c. Does not form an azeotrope with the primary liquid.

d. Produces a saturated vapor which does not support a high equilibrium moisture content.

e. Produces a saturated vapor which is non-oxidizing, chemically stable, non-toxic and non-inflammable.

In addition to the general properties hereinabove recited, when the facility is used to heat an article such as a printed circuit board having mounted thereon for soldering various electrical components, the secondary liquid should not be electrically conducting.

When the mixture of the primary and secondary liquids has been brought to a boil, the lower-boiling, non-azeotrope forming, secondary liquid will boil off first to form a body of secondary vapors which will fill the vessel 11 up to some level, depending upon the quantity of secondary liquid in the liquid mixture. After the secondary liquid has boiled off, the remaining primary liquid will be further heated, by means of the heating coil 12, until its boiling point is reached, whereupon the primary liquid will boil and produce a body of hot saturated primary vapors. The body of primary vapors being denser than the body of secondary vapors, as the primary vapors are formed and rise within the vessel 11, the lighter secondary vapors will be pushed upwardly in the vessel by the said primary vapors. In effect, the secondary body of vapors will be stably stratified over and float on the body of hot primary vapors and provide a vapor blanket between the hot primary vapors and the atmosphere.

The proportions of primary and secondary liquids in the mixture thereof will be selected and determined by the geometry of vessel 11, the locations of the sets of primary and secondary cooling coils 13 and 14, respectively, in the said vessel and the desired thickness of the layer of secondary vapor over the primary vapor. Specifically, the proportions of primary and secondary liquids in the mixture thereof are chosen so that, at equilibrium, after start-up as hereinabove described, there will exist in the vessel 11 a body of hot saturated essentially primary vapor, the top of which will be approximately at the level indicated diagrammatically by phantom line 32 extending through the primary set of cooling coils 13. There will also exist a body of a mixture of primary and secondary vapors extending from the level indicated diagrammatically by the phantom line 32 up to a level indicated diagrammatically by a second phantom line 33; there will also exist a body of saturated, essentially secondary, vapor extending from the level indicated diagrammatically by phantom line 33 up to a level indicated diagrammatically by a third phantom line 34 shown extending through the set of secondary cooling coils 14.

The set of primary cooling coils 13 is maintained at a temperature below the condensation temperature of the primary vapor (i.e., below the boiling point of the primary liquid) and above the boiling point of the secondary vapor. The set of secondary cooling coils 14 is maintained at a temperature below the condensation temperature of the secondary vapor (i.e., below the boiling point of the secondary liquid).

Condensate draining off the surface of the set of primary cooling coils 13, essentially primary liquid, is collected in the primary trough 15 and is returned to the lower portion of the vessel 11, above the liquid level 31, through the valved line 16.

Condensate draining off the surface of the set of secondary cooling coils 14, essentially secondary liquid, is collected in the secondary trough 17 and is returned through the line 18 to the storage tank 19 and pumped through the line 28 and onto the wick 26 in the form of a fine spray through the nozzles 29—29.

Prior condensation heating facilities used various means and methods to supplement and maintain the body of secondary vapor. An offset vapor generator, outside the facility, communicating with the body of secondary vapor provided sufficient vapor to maintain the secondary body of vapor. However, such a generator is expensive and requires a high degree of control. Other methods either fed the secondary liquid directly into the hot primary liquid or sprayed the secondary liquid onto the primary-secondary interface. Such methods caused a violent mixing which caused undesirable losses of the expensive primary vapor.

The wick 26 precludes these problems by transporting the secondary liquid down through the body of secondary vapor and into the body of hot primary vapors. The secondary liquid is dispersed over the relatively large surface area of the wick 26 resulting in a gentle and uniform flow and vaporization thereof. The body of hot primary vapor is at a substantially higher temperature than the boiling temperature of the secondary liquid which causes the secondary liquid to vaporize in order to supplement and maintain the body of secondary vapor. Optimally, substantially all of the secondary liquid sprayed onto the wick will vaporize when above the condensate in the primary trough 15 and below the top of the body of hot primary vapors indicated by the first phantom line 32 where the temperatures are well above the boiling point of the secondary liquid.

The wick 26 used in an exemplary embodiment was a knitted wire 50 density mesh, which was 6 inches wide, with 12 strands of 0.0045 inch, 316 stainless steel wire. The wick 26 is not limited to stainless steel, for other metals may be used as well as cloth fabric or other non-deteriorating or slow deteriorating material.

Advantageously, the wick 26 may be removably supported from the hanger 27 by hooks, clips, snaps or the like. Such an arrangement facilitates the removal of the wick 26 for cleaning, repair or replacement.

The purpose of the spray nozzles 29—29 is to deposit the secondary liquid over a larger surface area of the upper portion of the wick 26 to further ensure a gentle uniform flow thereof down the wick. However, the same result can be accomplished by feeding the secondary fluid directly onto the upper end of the wick 26 at more closely spaced intervals. The spacing of such intervals would depend upon the wicking ability of the wick 26 and the deposition rate of the secondary fluid onto the wick.

Care should be taken to control the deposition rate of secondary liquid sprayed onto the wick 26 for a very high injection rate could cause some of the secondary fluid to enter into the primary condensate in the trough 15. This could cause violent boiling and turbulence and disrupt the primary-secondary interface resulting in loss of the expensive primary vapors.

By extending the wick 26 into the hot primary condensate in the trough 15, the wick is advantageously heated which aids in the evaporation of the secondary liquid moving down the wick. However, it is not necessary that the wick 26 extend into the hot primary condensate, as long as it does extend into the body of hot primary vapors below the phantom line 32. If the secondary liquid injection rate is set properly, it will vaporize prior to reaching the lower end of the wick 26 as hereinbefore indicated.

Additionally, the wick 26 does not have to be mounted completely around the inside periphery of the vessel 11, it may cover a smaller portion of the inside periphery depending on the desired injection rate of the secondary liquid into the system. A slow injection rate would require a smaller wick surface area for transporting the secondary liquid to the body of hot primary vapor. Furthermore, the wick 26 does not have to be mounted around the inside periphery, but may be located at any position within the vessel 11 as long as it does not interfere with the movement of articles into and out of the vessel.

Advantageously, the wick 26 disperses the secondary liquid more uniformly than other methods hereinbefore discussed. The instant wicking method provides a gentle and uniform feeding of the secondary liquid into the body of hot primary vapor resulting in a slow vaporization and a gentle mixing of the primary-secondary vapors. Such a gentle mixing causes a minimal disturbance of the primary-secondary interface and substantially decreases the loss of the expensive primary vapors.

The operation of an exemplary embodiment shown in the FIGURE will now be described specifically in connection with a soldering, although the instant invention is not so limited. After the bodies of primary and secondary vapors have been established in the vessel 11, as hereinabove described, an article 41, which may for example, be a printed circuit board with electrical components mounted thereon for soldering and with solder preforms or plating as required provided thereon in a known manner, is lower in the vessel. The article 41 passes through the body of secondary vapor into the body of hot saturated primary vapor, below the set of primary cooling coils 13 and is held suspended in this position as shown in the FIGURE. Hot saturated primary vapor will condense on the article 41, giving up latent heat of vaporization to heat the article until the temperature of the article approaches or reaches the temperature of the saturated body of hot primary vapor. That temperature is the boiling point of the primary heat transfer liquid, and which, as hereinbefore mentioned, is at least equal to, and preferably above, the melting point of the solder used for the operation. The article 41 will approach or reach the temperature of the body of hot saturated primary vapor rapidly, because heat transfer coefficients for condensation processes are among the highest known for any mode of heat transfer. The solder will melt or reflow to effect the soldering operation on the article (e.g., to effect the soldering of electrical components to a printed circuit board).

The high rate of heat transfer from the condensing hot saturated primary vapor to the article 41, permitting the soldering operation to be completed rapidly, results in an exposure of relatively short duration of the article to the elevated soldering temperature. Where the article 41 is a printed circuit board having electrical components mounted for soldering thereon, this relatively short exposure to the elevated soldering temperatures prevents heat damage to the said printed circuit board and associated electrical components which might otherwise occur under more prolonged exposure to such elevated temperature.

With adequate vapor generating capacity in the condensation heat transfer facility 10 (and it will be understood that heating coil 12, and auxiliary heating means such as a hot plate, if employed, are so sized as to be capable of maintaining the level of hot saturated essentially primary vapor up to approximately the level of the first phantom line 32 when the article 41 is introduced into such hot saturated essentially primary vapor), soldering times may range between approximately 5 seconds for typical light printed circuit boards and components with low thermal mass to approximately 90 seconds for typical massive printed circuit boards and components with high thermal mass. Primary vapors condensing on the article 41 will drain back to the body of liquid in the lower portion of vessel 11. It will be seen that the primary heat transfer liquid is continuously being distilled, that non-volatile contaminants remain in the body of the liquid at the bottom of the vessel 11, and that primary vapors condensing on the article 41 are relatively clean. The hot saturated primary vapor, being non-oxidizing, may eliminate in some instances any need for fluxing the article 41. After the solder has melted or reflowed, the article 41 is removed, through the body of secondary vapor blanketing the body of primary vapor, from the vessel 11 and cooled to ambient temperature.

During the soldering operation secondary vapor is continuously condensing on the cooling coils 34 (and some secondary vapor is being continuously lost to the atmosphere). The secondary vapor condensate is recirculated through the line 18 and the tank 19 (where additional secondary liquid may be supplied from an outside source) and is sprayed onto the wick 26 where it is wicked down to the body of hot primary vapor.

The secondary fluid is then evaporated by the hot primary vapors to supplement and maintain the body of secondary vapors.

Although the operation hereinabove described for the FIGURE has been based upon soldering one article 41, it will be understood that a batch of articles may be introduced at one time into the vessel 11 for simultaneous soldering.

In a specific example wherein the article 41 is a printed circuit board, and electrical components are to be soldered thereto with solder melting at 360° F. (182.2° C.), the primary heat transfer liquid advantageously is selected from the group of liquids known generically as fluorocarbons. One such liquid is sold by E. I. DuPont de Nemours and Co. under the tradename "FREON E5" and has the following significant properties:

Boiling point at atmospheric pressure — 435.6° F. (224.2° C.)

Electrical resistivity — greater than $4 \times 10^{14}$ ohm-cm.

Dielectric constant — 2.45

Latent heat of vaporization — 19.9 BTU/No.

Density of saturated vapor at boiling point and atmospheric pressure — 1.45 No./ft.$^3$ Chemical stability, inertness, non-toxicity, non-flammability.

Another suitable primary heat transfer liquid is sold by Minnesota Mining and Manufacturing Co. under the tradename "FLUORINERT FC-70" and has the following significant properties:

Boiling point at atmospheric pressure — 419° F. (215° C.)

Dielectric constant — 1.94

Latent heat of vaporization — 23 BTU/No.

Density of saturated vapor at boiling point and atmospheric pressure — 1.27 No./ft.$^3$ Chemical stability, inertness, non-toxicity, non-flammability.

A suitable secondary liquid adapted for use in the manner hereinbefore described with either "FREON E5" or "FLUORINERT FC-70" as the primary heat transfer liquid advantageously is selected from the group of liquids known generically as halogenated hydrocarbons such as trichloro-trifluoro-ethane. Such a liquid is sold by E. I. DuPont de Nemours and Co. under the tradename "FREON TF" and has the following significant properties:

Boiling point at atmospheric pressure — 117.6° F. (47.6° C.)

Electrical resistivity — greater than $2 \times 10^{15}$ ohm-cm.

Dielectric constant — 2.41

Latent heat of vaporization — 63.12 BTU/No.

Density of saturated vapor at boiling point and atmospheric pressure — 0.461 No./ft.$^3$ Substantial chemical stability, very low toxicity, non-flammability.

The facility 10 shown in the FIGURE was successfully operated, employed "FLUORINERT FC-70" as the primary liquid and "FREON TF" as the secondary liquid, "FREON TF" constituting 5 percent by volume of the mixture of the two liquids. The primary set of cooling coils was operated at approximately 125° F. (51.7° C.) and the secondary set of cooling coils at approximately 40° F. (4.4° C.).

What is claimed is:

1. A method for maintaining a body of secondary vapor in a condensation heating facility having a vessel, open to the atmosphere, containing a body of hot primary vapor with the body of secondary vapor interposed between the body of primary vapor and the atmosphere, the method comprising the steps of:

depositing a secondary liquid on a wick mounted within the vessel, and wicking the secondary liquid through the secondary body of vapor and into contact with the body of hot primary vapor to vaporize the secondary liquid to provide supplemental secondary vapor to maintain the body of secondary vapor.

2. The method of claim 1 wherein the depositing step is accomplished by:

spraying the secondary liquid onto the wick.

* * * * *